US005333250A

United States Patent [19]

Staley, II et al.

[11] Patent Number: 5,333,250

[45] Date of Patent: Jul. 26, 1994

[54] METHOD AND APPARATUS FOR DRAWING ANTIALIASED LINES ON A RASTER DISPLAY

[75] Inventors: Terrance L. Staley, II, Highland; William F. Lawless, Red Hook, both of N.Y.

[73] Assignee: International Business Machines Corporation, Armonk, N.Y.

[21] Appl. No.: 902,324

[22] Filed: Jun. 22, 1992

[51] Int. Cl.[5] .............................................. G06F 15/16

[52] U.S. Cl. .................................................... 395/143

[58] Field of Search ................ 395/143, 141; 340/747, 340/750; 382/22, 46; 345/136, 137, 138, 16, 17

[56] References Cited

U.S. PATENT DOCUMENTS

| | | | |
|---|---|---|---|
| 4,586,037 | 4/1986 | Rosener et al. | 340/728 |
| 4,796,020 | 1/1989 | Budrikis et al. | 340/728 |
| 4,855,935 | 8/1989 | Lien et al. | 364/521 |
| 4,873,515 | 10/1989 | Dickson et al. | 340/728 |
| 5,136,689 | 8/1992 | Waller | 395/143 |
| 5,202,960 | 4/1993 | Seiler | 395/143 |
| 5,220,650 | 6/1993 | Barkans | 395/163 |

FOREIGN PATENT DOCUMENTS 0242106 10/1987 United Kingdom .

OTHER PUBLICATIONS

Akeley et al., "High-Performance Polygon Rendering", *Computer Graphics*, vol. 22, No. 4, pp. 239–246, Aug. 1988.

Pitteway et al., "Bresenham's Algorithm with Grey Scale", *Communications of the ACM*, vol. 23, No. 11, pp. 625–626, Nov. 1980.

Gupta et al., "Filtering Edges for Gray-Scale Displays", *Computer Graphics*, vol. 15, No. 3, pp. 1–5, Aug. 1981.

Foley et al., *Fundamentals of Interactive Computer Graphics*, pp. 433–436, 1982.

A Modular Rendering Unit with Antialiasing for High--Speed 3D Image-Generation, P. Gros-G. Fontenier, pp. 163–167, 1988.

Two Algorithms for Drawing Anti-Aliased Lines, Dan Field, Graphics-Interface '82, pp. 87–95, 1982.

A Trip Down the Graphics Pipeline: Subpixelic Particles, J. Blinn,-IEEE Computer Graphics & Applications, pp. 86–90, Sep. 1991.

An Efficient Antialiasing Technique, X. Wu., Computer Graphics, vol. 25, No. 4, Jul. 1991, pp. 143–152.

*Primary Examiner*—Phu K. Nguyen

*Attorney, Agent, or Firm*—Mark S. Walker; William A. Kinnaman, Jr.

[57] ABSTRACT

Antialiased lines are generated in a computer graphics system by drawing the pixels on one side of the ideal line segment in the minor axis direction on one pass and drawing the pixels lying on the other side of the line segment in the minor axis direction on another pass. A modified Bresenham procedure is used to generate the pixel positions on both passes. On either pass, intensity values are generated from the integral Bresenham determinant directly, rather than from the perpendicular or vertical distance between the pixel and the line.

27 Claims, 7 Drawing Sheets

PIXELS SELECTED IN A NORMAL ALIASED LINE

PIXELS SELECTED FOR A TWO-PIXEL APPROXIMATED ANTIALIAS LINE.

METHOD AND APPARATUS FOR DRAWING ANTIALIASED LINES ON A RASTER DISPLAY

BACKGROUND OF THE INVENTION

1. Field of the Invention

This invention relates to a method and apparatus for drawing antialiased lines on a raster scan display device of a computer graphics system.

2. Description of the Related Art

Images displayed on computer graphics displays often suffer from the presence of aliasing artifacts that give a jagged appearance to lines or polygon edges displayed on the screen. Antialiasing is a technique for smoothing jagged lines drawn on a computer graphics image.

Various methods of drawing antialiased lines are known in the art, including those described in the following references and the references cited therein:

Pitteway et al., "Bresenham's Algorithm with Grey Scale", *Communications of the ACM*, Vol. 23, No. 11, pp. 625–626 (Nov. 1980);

Gupta et al., "Filtering Edges for Gray-Scale Displays", *Computer Graphics*, Vol. 15, No. 3, pp. 1–5 (Aug. 1981);

Akeley et al., "High-Performance Polygon Rendering", *Computer Graphics*, Vol. 22, No. 4, pp. 239–246 (Aug. 1988);

U.S. Pat. No. 4,586,037 (Rosener et al.);

U.S. Pat. No. 4,796,020 (Budrikis et al.);

U.S. Pat. No. 4,873,515 (Dickson et al.).

Several of these methods involve variants of the Bresenham incremental line-drawing procedure, in which an incrementally generated error term is used to determine intensity values as well as the pixel addresses of the line approximation. Thus, Gupta et al. (1981) use an incrementally generated term representing the perpendicular distance between the pixel center and the center of the ideal line as an index to a lookup table of intensity values representing a conical filter. Similarly, Rosenet et al. and Dickson et al. use incrementally generated terms representing the vertical distance between the pixel center and the center of the ideal line as indices to lookup tables. In each of these cases, the actual distance (perpendicular or vertical) of the line from the pixel center is used to determine the pixel intensity. Since the actual distance is generally a fractional number, the hardware required for such an operation can be quite expensive.

Most of these methods of antialiasing use a differential digital analyzer (DDA) line drawing procedure or slope method. To obtain the slope of a line, the minor axis increment is divided by the minor axis increment. A divide in hardware takes a lot of time and logic, and is therefore, undesirable.

SUMMARY OF THE INVENTION

In general, the present invention a new technique of drawing antialiased lines. This technique can be implemented using a small amount of hardware with little degradation in performance from a normal Bresenham method. This technique uses a two-pixel approximation for drawing antialiased lines. Using this technique, the antialiased lines are drawn using a simple Bresenham procedure. The actual value of the determinant, or decision variable, of the Bresenham parameters directly selects the blending ratio for each pixels intensity.

In accordance with the present invention, an antialiased pixel approximation is generated in two passes, pixels on one side of the true line being drawn on one pass and pixels on the other said of the true line being drawn on the other pass. On each pass, a first Bresenham line generator iteratively generates new values of a determinant to be used for generating intensity values, while a second Bresenham line generator iteratively generates new values of a determinant to be used for generating pixel addresses. The first Bresenham line generator receives the same initial Bresenham parameters that are used to generate an aliased line. The determinant that is iteratively generated is simultaneously compared with each of a plurality of comparison values, and an intensity value appropriate for the pass is generated in accordance with the results of the comparison.

The second Bresenham line generator receives a first set of Bresenham parameters for the first pass and another set of parameters for the second pass. On each pass, the sign of the Bresenham determinant that is iteratively generated is used to determine whether to move diagonally or along the major axis only, in a manner that is similar to the standard Bresenham procedure.

DESCRIPTION OF THE PREFERRED EMBODIMENT

1. General

Figure 1:
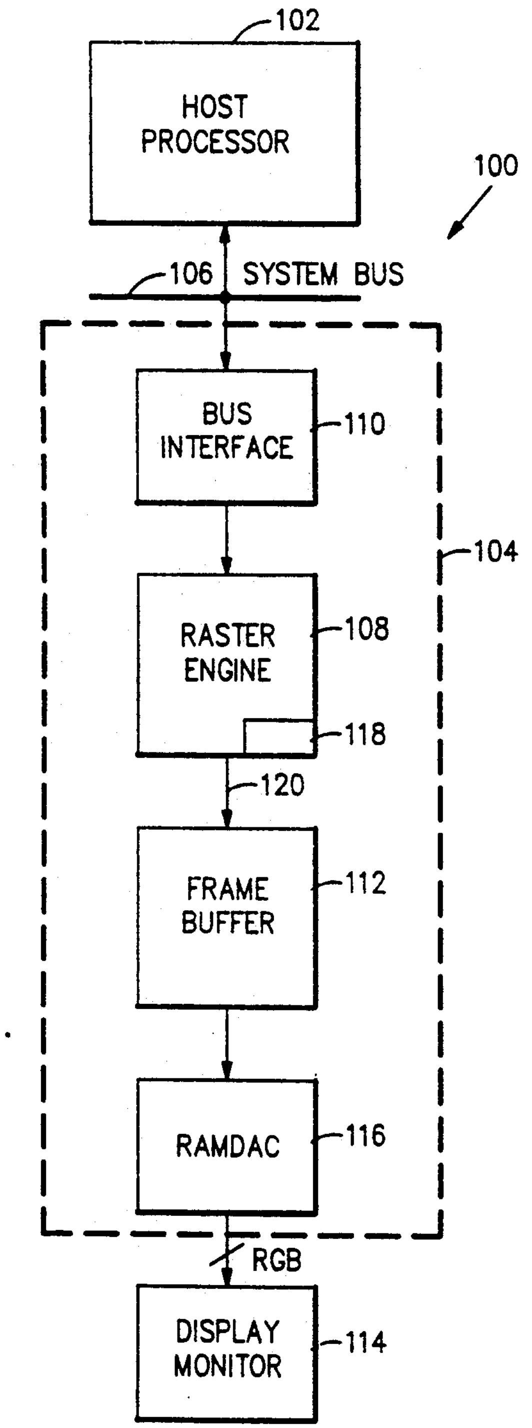
FIG. 1 is a schematic block diagram of a computer graphics system incorporating the antialiasing system of the present invention.

Referring to FIG. 1, a system 100 incorporating the present invention includes a host processor 102 and a graphics adapter or subsystem 104 coupled to host processor 102 via a system bus 106. Host processor 102 may be a RISC-based processor such as that of an IBM RISC System/6000 workstation, while bus 106 may be a bus such as the Micro Channel bus having a 32-bit data path. (RISC System/6000 and Micro Channel are trademarks of IBM Corporation.)

In the particular example shown, graphics subsystem 104 includes a two-dimensional (2-D) graphics processor or raster engine 108 coupled to bus 106 via a bus interface 110. Graphics processor 108 is in turn coupled to a frame buffer 112, which stores color information for each picture element (pixel or pel) of the display. A typical display in a graphics workstation, such as in the RISC System/6000 referred to above, may span 1280 pixels horizontally and 1024 pixels vertically. Frame buffer 112 contains a predetermined number of bit planes for color information (8 and 24 planes are common numbers) and, optionally, additional planes for storing window information, overlay information, and the like.

Color information is periodically scanned out of the frame buffer 112 along horizontal scan lines and supplied to the color (RGB) inputs of a display monitor 114 via a RAMDAC 116. In a manner that is conventional in the art, RAMDAC 116 consists of a random access memory (RAM) (not separately shown) that is addressed by the color output from the frame buffer 112 and whose output drives a digital-to-analog converter (DAC) for each of the RGB color components. The RAM of RAMDAC 116 functions as a color palette or lookup table for performing desired conversions between the output color from frame buffer 112 and the color supplied to monitor 114. Although in the system shown in FIG. 1 the display device is a monitor, the present invention may also be used with other display devices such as printers.

Graphics processor 108, which includes the antialiasing logic 118 of the present invention, accepts data from the host processor 102, which may represent a straight line segment or vector in terms of the coordinates of its endpoints, and "rasterizes" that data by converting it to a form suitable for storage in the frame buffer 112 and ultimately display on monitor 114. In particular, graphics processor 108 generates a pixel approximation of an ideal line segment by generating appropriate intensity values for pixels adjacent to the ideal line, while simultaneously generating address values corresponding to pixel locations on the display screen. These intensity and address values are placed on the data and address lines (not separately shown) of the pixel bus coupling graphics processor 108 and frame buffer 112.

Figure 2:
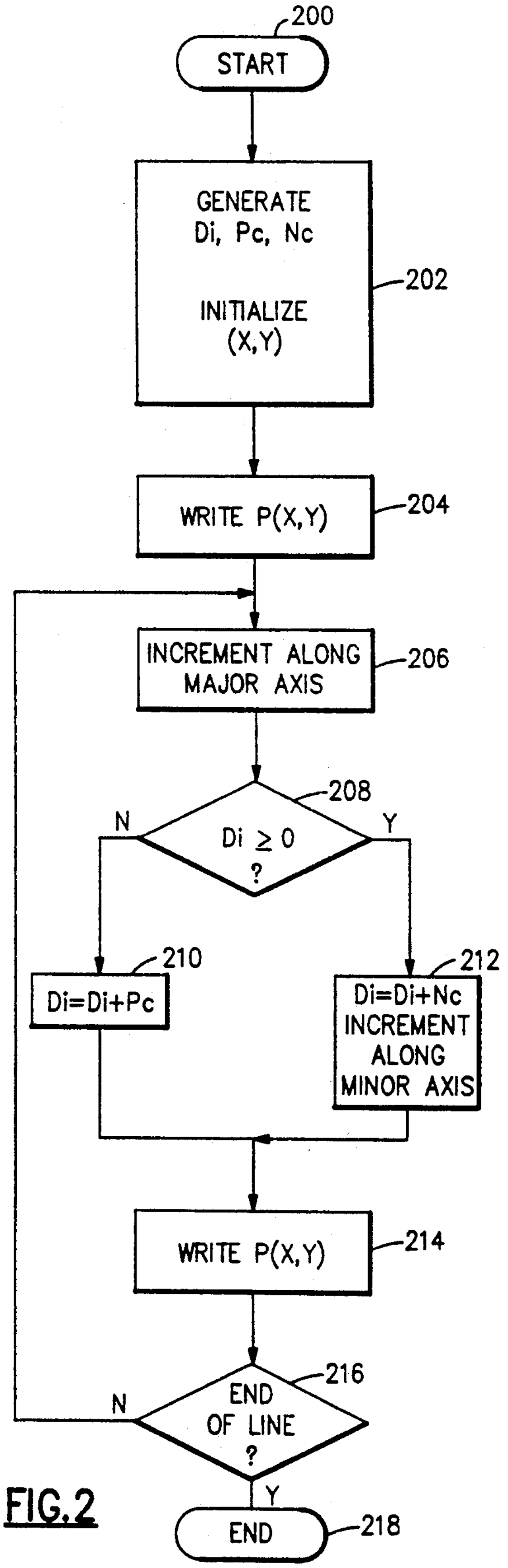
FIG. 2 is a flowchart of the Bresenham procedure conventionally used to draw lines in a raster scan system.

Graphics systems such as the system 100 shown in FIG. 1 conventionally use an incremental procedure such as the Bresenham procedure to generate a pixel approximation of an oblique line segment, which cannot be reproduced exactly because of the inherent granularities of the rasterization process. A discussion of the Bresenham procedure may be found at pages 433–436 of J. D. Foley et al., *Fundamentals of Interactive Computer Graphics* (1982), incorporated herein by reference. FIG. 2 shows a conventional version of the Bresenham procedure for drawing a non-antialiased pixel approximation of an ideal line (FIG. 3) extending between (X0, Y0) and (X1, Y1). In the particular example shown in FIG. 3, (X0, Y0)=(0, 0) and (X1, Y1)=(9, 3), but the procedure is general for integral endpoints.

The X and Y increments dX and dY are defined as:

$$dX = X1 - X0$$

$$dY = Y1 - Y0$$

and are assumed to be both positive in the example that follows. Also, dX is assumed to be greater than dY. The procedure is readily extendible, however, to use with other values of dX and dY.

Upon being invoked (step 200), the procedure first calculates the so-called Bresenham parameters (step 202), including a positive correction:

$$Pc = 2A,$$

a negative correction:

$$Nc = 2A - 2B,$$

and an initial determinant:

$$Di = 2A - B$$

where A is the lesser of dX or dY, and B is the greater. As already noted, in the example shown it is assumed that the major increment is along the X axis and the minor increment along the Y axis. Pixel addresses X and Y are initialized at X0 and Y0 (step 202), and the first pixel (X0, Y0) is written into the frame buffer 112 (step 204).

An iteration of the procedure (steps 206–216) is then performed for each increment along the major (X) axis. On each iteration, X is incremented (step 206) and the determinant Di is compared with zero, preferably by examining the sign bit (step 208). If $Di \geqq 0$, Y is also incremented so that the line moves in both the major (X) and minor (Y) directions while the negative correction Nc is added to the determinant (step 212):

$$Di = Di + Nc.$$

On the other hand, if $Di < 0$, the line moves only in the major (X) direction and the positive correction Pc is added to the determinant (step 210):

$$Di = Di + Pc.$$

The pixel location in the frame buffer 112 corresponding to the new position (X, Y) is then updated (step 214). If the end of the line has not been reached at this point (step 216), the procedure returns to step 206 for another iteration; otherwise, the procedure ends (218). At the completion of the procedure, the frame buffer 112 will contain a line approximation consisting of one pixel for each major (X) axis position between the line endpoints (X0, Y0) and (X1, Y1).

Figure 3:
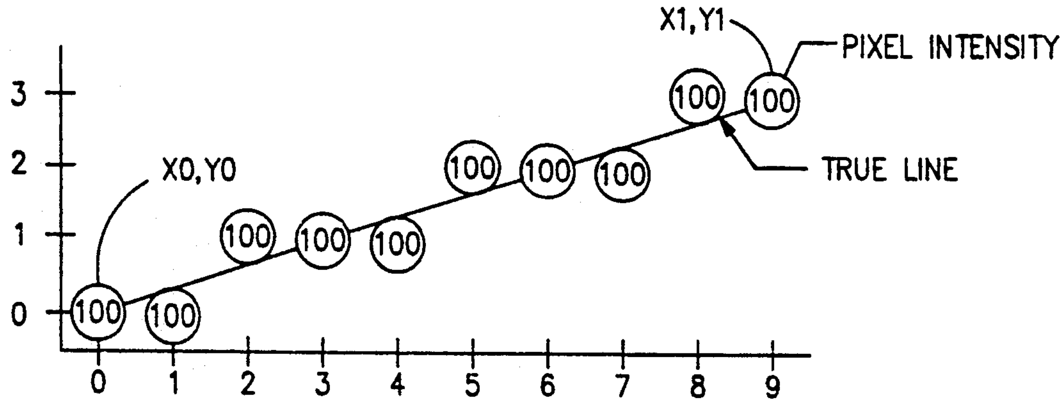
FIG. 3 shows a line with aliasing, drawn in accordance with the procedure shown in FIG. 2.

As already noted, FIG. 3 shows how a line is conventionally drawn in a raster scan system, using the Bresenham procedure. Except for certain cases, such as a line parallel to one of the coordinate axes or exactly at a 45° angle relative to the coordinate axes, a staircase pattern is produced, with the pixels forming steps rather than a smooth oblique line. This is an inevitable result a rasterization system when each pixel can assume only a single foreground or background value, and its practical effect can be minimized in such a system only by increasing the screen resolution to make the staircase pattern less noticeable.

In general, antialiasing systems address this problem by generating pixels of variable intensity, depending on their distance from the edge of an ideal object. Thus, a pixel fully on an ideal line of some assumed thickness (typically a single pixel) is given the full foreground value, while a pixel only partly on the line is given a value intermediate the foreground and background values, as determined by the pixel coverage of the line.

Figure 4:
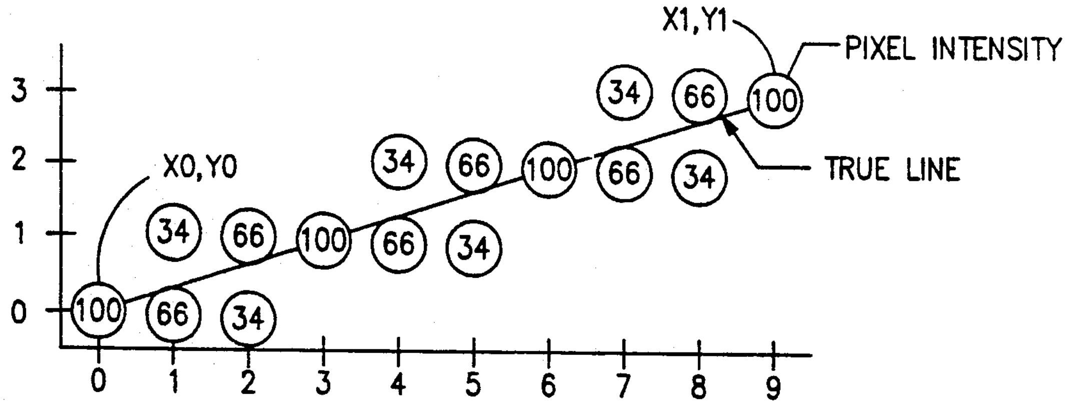
FIG. 4 shows an antialiased line drawn in accordance with the present invention.

FIG. 4 shows an antialiased pixel approximation of the same ideal line that was reproduced in FIG. 3 with aliasing. In the antialiased pixel approximation shown in FIG. 4, two pixels are generally drawn for each major (X) axis increment, one below the true line and the other above the true line. (As will be discussed below, only a single pixel is drawn when a pixel position exactly coincides with the true line, as it does at four points on the line shown in FIG. 4). Further, rather than being given a fixed shading, each pixel is shaded in accordance with the proximity of the ideal line to the pixel center. Although such a technique blurs the edges of lines somewhat, the absence of noticeable "jagging" from the antialiased image generally more than compensates for this minor deficiency.

The present invention has two aspects. The first relates to the use of the determinant Di to select the intensity values of the pixels making up the antialiased image. The second relates to the generation of pixel addresses for the actual drawing of the antialiased line.

2. Generation of Intensity Values

Figure 5A:
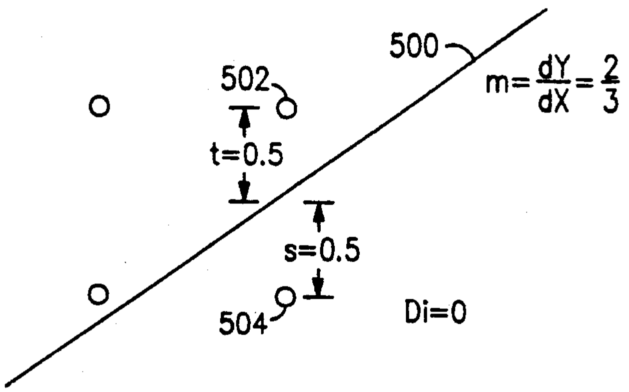
FIGS. 5A–5C illustrate the relation between the value of the Bresenham determinant Di and the position of the true line relative to adjacent pixels.
Figure 5B:
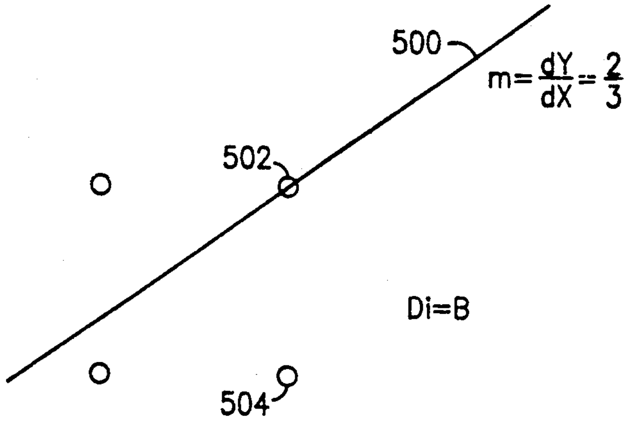
Figure 5C:
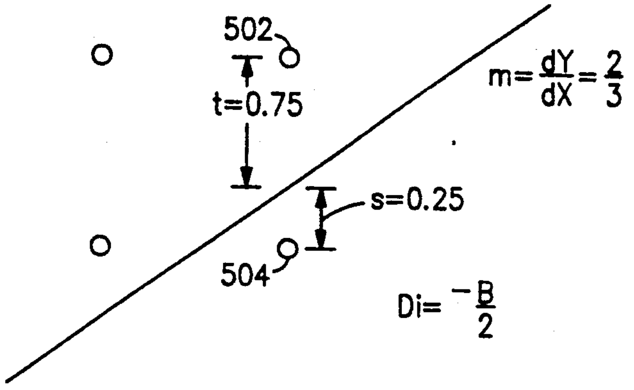

Referring to FIGS. 5A-5C, s represents the minor (Y) axis distance between an ideal line 500 and the center of a pixel 504 just below the line, while t represents the minor axis distance between the ideal line and the center of a pixel 502 just above the line. Since the interpixel spacing along either dimension is assumed to be 1, we have the relations:

$$0<s<1;$$

$$0<t<1;$$

$$s+t=1 \text{ if } s\neq 1, t\neq 1.$$

If the true line passes through a pixel center, s and t are defined to be both 1.

In accordance with the shading concept discussed above, s is used to determine the shading of the pixel above the true, while t is used to determine the shading of the pixel below the true line. This ensures that the pixels are shaded in accordance with their proximity to the true line, as well as that the sum of the intensities remains constant.

The first aspect of the present invention in based upon the fact that the minor (Y) axis spacings s and t between the pixel centers and the true line 500, and hence the antialiased shading values for the two pixels 502 and 504 straddling the true line, may be derived from the value of the determinant Di generated for the corresponding major (X) axis value during the Bresenham procedure shown in FIG. In accordance with this aspect of the present invention, antialiased lines are drawn using the same initial Bresenham parameters and iterations as in the aliased example shown in FIG. 2. However, the actual determinant value (Di) is used to select the intensity value for the particular pixel being drawn above or below the true line.

Referring still to FIGS. 5A-5C, the following relationships may be shown to exist between the value of the determinant Di at the beginning of a given iteration of the Bresenham procedure (FIG. 2) and the position of the true line 500 relative to a pixel 502 on or above the true line and a pixel 504 below tile true line for the corresponding major (X) axis value. When Di=0 (FIG. 5A), the line 500 passes exactly halfway between the two pixels 502 and 504, and s and t are each equal to 0.5. When drawing antialiased lines, each of the pixels 502 and 504 should be shaded with 50% of the line intensity.

When Di=B (dX in our example), the line 500 passes through the pixel 502, s=1 and t=1 (FIG. 5B). Pixel 502 is shaded with 100% of the line intensity, while pixel 504 is not drawn at all.

As a final example, when Di=−B/2 (FIG. 5C), the line 500 passes through a point spaced nearer to the lower pixel 504 such that s=0.25 and t=0.75. In this example, upper pixel 502 is shaded 25% of the line intensity while lower pixel is shaded 75% of the full line intensity.

In general, the relationship between Di and s and t is as follows:

| | | |
|---|---|---|
| s = | Di/2B + 3/2 | −2B ≦ Di ≦ −B |
| | Di/2B + 1/2 | −B < Di ≦ B |
| | Di/2B − 1/2 | B < Di ≦ 2B |
| t = | −Di/2B − 1/2 | −2B ≦ Di < −B |
| | −Di/2B + 1/2 | −B ≦ Di < B |
| | −Di/2B + 3/2 | B ≦ Di ≦ 2B |

Figure 6A:
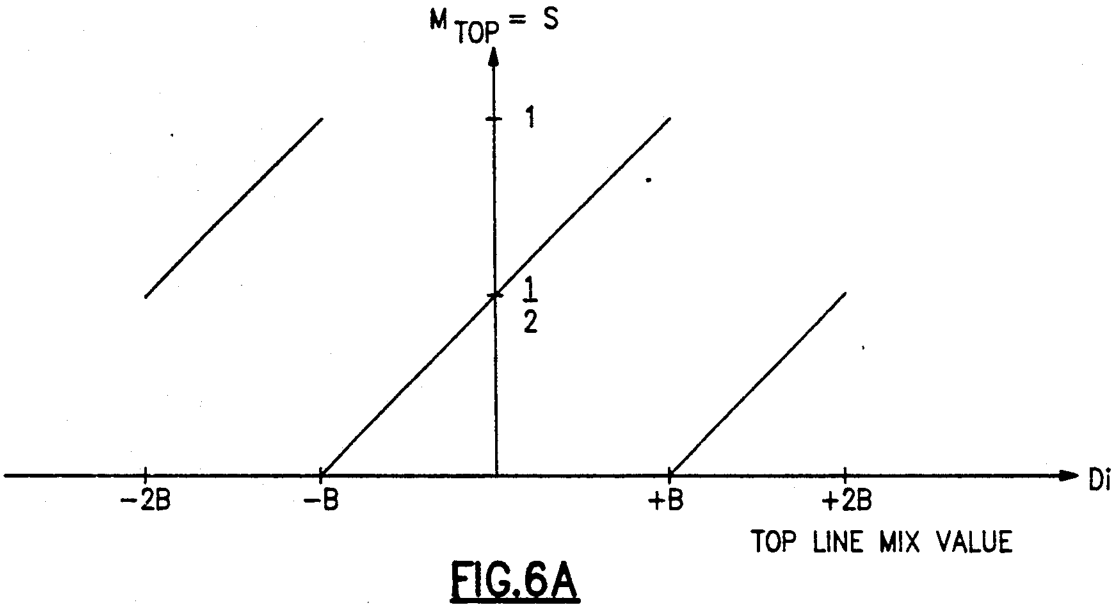
FIGS. 6A–6B illustrate the relation between the value of the Bresenham determinant and the mix values generated in accordance with the present invention.
Figure 6B:
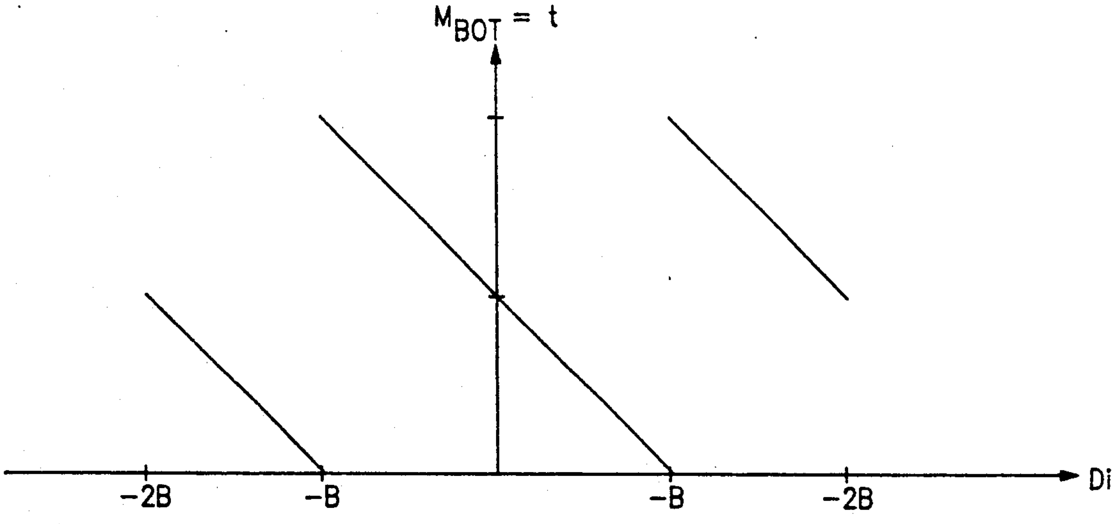

These relationships are shown graphically in FIG. 6A (for s) and FIG. 6B (for t). Note that s(Di)=t(−Di).

The following table tabulates the top line mix value s (FIGS. 5A-5C) as a function of Di for steps of B/8 between −2B and +2B:

TABLE 1

| Determinant (Di) | Top Line Mix Value s (%) |
|---|---|
| +2.000B | 50.00 |
| +1.875B | 43.75 |
| +1.750B | 62.50 |
| +1.625B | 31.25 |
| +1.500B | 25.00 |
| +1.375B | 18.75 |
| +1.250B | 12.50 |
| +1.125B | 6.25 |
| +1.000B | 100.00 |
| +0.875B | 93.75 |
| +0.750B | 87.50 |
| +0.625B | 81.25 |
| +0.500B | 75.00 |
| +0.375B | 68.75 |
| +0.250B | 37.50 |
| +0.125B | 56.25 |
| +0.000B | 50.00 |
| −0.125B | 43.75 |
| −0.250B | 37.50 |
| −0.375B | 31.25 |
| −0.500B | 25.00 |
| −0.750B | 12.50 |
| −0.875B | 6.25 |
| −1.000B | 100.00 |
| −1.125B | 93.75 |
| −1.250B | 87.50 |
| −1.375B | 81.25 |
| −1.500B | 75.00 |
| −1.635B | 68.75 |
| −1.750B | 62.50 |
| −1.875B | 56.25 |
| −2.000B | 50.00 |

In a similar manner, the following table tabulates the bottom line mix value t (FIGS. 5A-5C) as a function of Di for steps of B/8 between −2B and +2B.

TABLE 2

| Determinant (Di) | Bottom Line Mix Value t (%) |
|---|---|
| +2.000B | 50.00 |
| +1.875B | 56.25 |
| +1.750B | 62.50 |
| +1.625B | 68.75 |
| +1.500B | 75.00 |
| +1.375B | 81.25 |
| +1.250B | 87.50 |
| +1.125B | 93.75 |

TABLE 2-continued

| Determinant (Di) | Bottom Line Mix Value t (%) |
|---|---|
| +1.000B | 100.00 |
| +0.875B | 6.25 |
| +0.750B | 12.50 |
| +0.625B | 18.75 |
| +0.500B | 25.00 |
| +0.375B | 31.25 |
| +0.250B | 37.50 |
| +0.125B | 43.75 |
| +0.000B | 50.00 |
| −0.125B | 56.25 |
| −0.250B | 62.50 |
| −0.375B | 68.75 |
| −0.500B | 75.00 |
| −0.625B | 81.25 |
| −0.750B | 87.50 |
| −0.875B | 93.75 |
| −1.000B | 100.00 |
| −1.125B | 6.25 |
| −1.250B | 12.50 |
| −1.375B | 18.75 |
| −1.500B | 25.00 |
| −1.635B | 31.25 |
| −1.750B | 37.50 |
| −1.875B | 43.25 |
| −2.000B | 50.00 |

Figure 7:
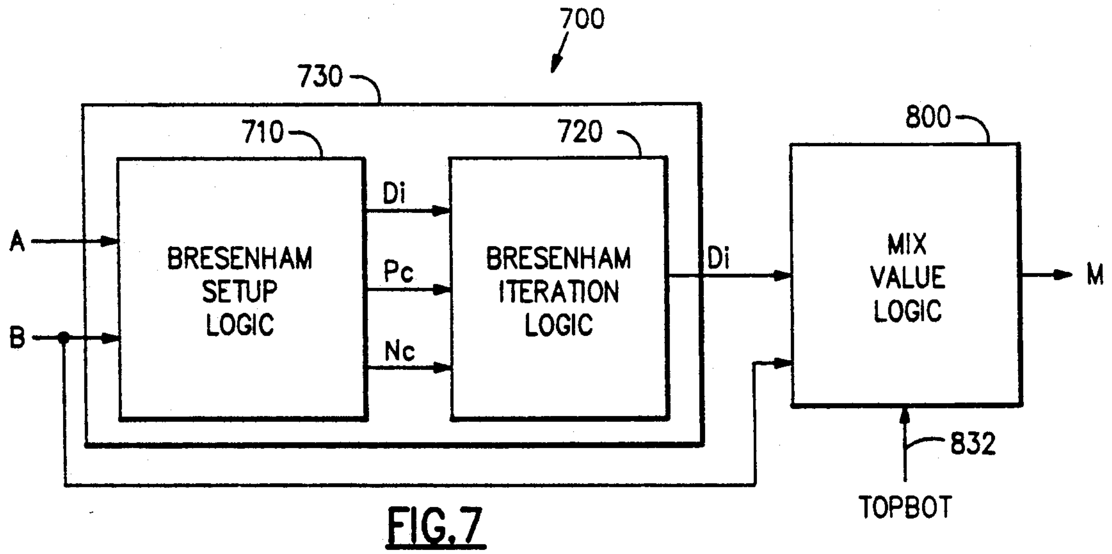
FIG. 7 is a schematic block diagram of the intensity value logic of the present invention.

These tables are implemented by hardware contained in the mix value logic to be discussed below. FIG. 7 shows the overall organization of the intensity value logic 700 of antialiasing logic 118 (FIG. 1). Bresenham setup logic 710 receives as inputs the increments:

$$A=min(dX, dY)$$

$$B=max(dX, dY)$$

and generates from these the Bresenham parameters:

$$Di=2A-B$$

$$Pc=2A$$

$$Nc=2A-2B.$$

Bresenham iteration logic 720 receives the inputs Di, Pc and Nc and iteratively generates a new value of the determinant Di for each pixel 502 or 504 (FIGS. 5A-5C), along the segment 500 as a function of the previous value of the determinant Di and the positive and negative corrections Pc and Nc. Finally, mix value logic 800 receives the iteratively generated values of the determinant Di and generates therefrom mix values M for each pixel along the segment as a function of the value of the determinant generated for the pixel.

Setup logic 710 and iteration logic 720, which may be integrated into a single hardware element 730, may comprise any suitable Bresenham line generator known to the art , such as the one shown in Corona et al. U.S. Pat. No. 5,047,954, incorporated herein by reference . Since the only purpose of the line generator 730 in the system 100 is to generate successive values of Di from which mix values may be derived, the line generator need not generate as outputs the coordinate values X and Y; these coordinate values are instead generated by the pixel address logic described below.

Figure 8:
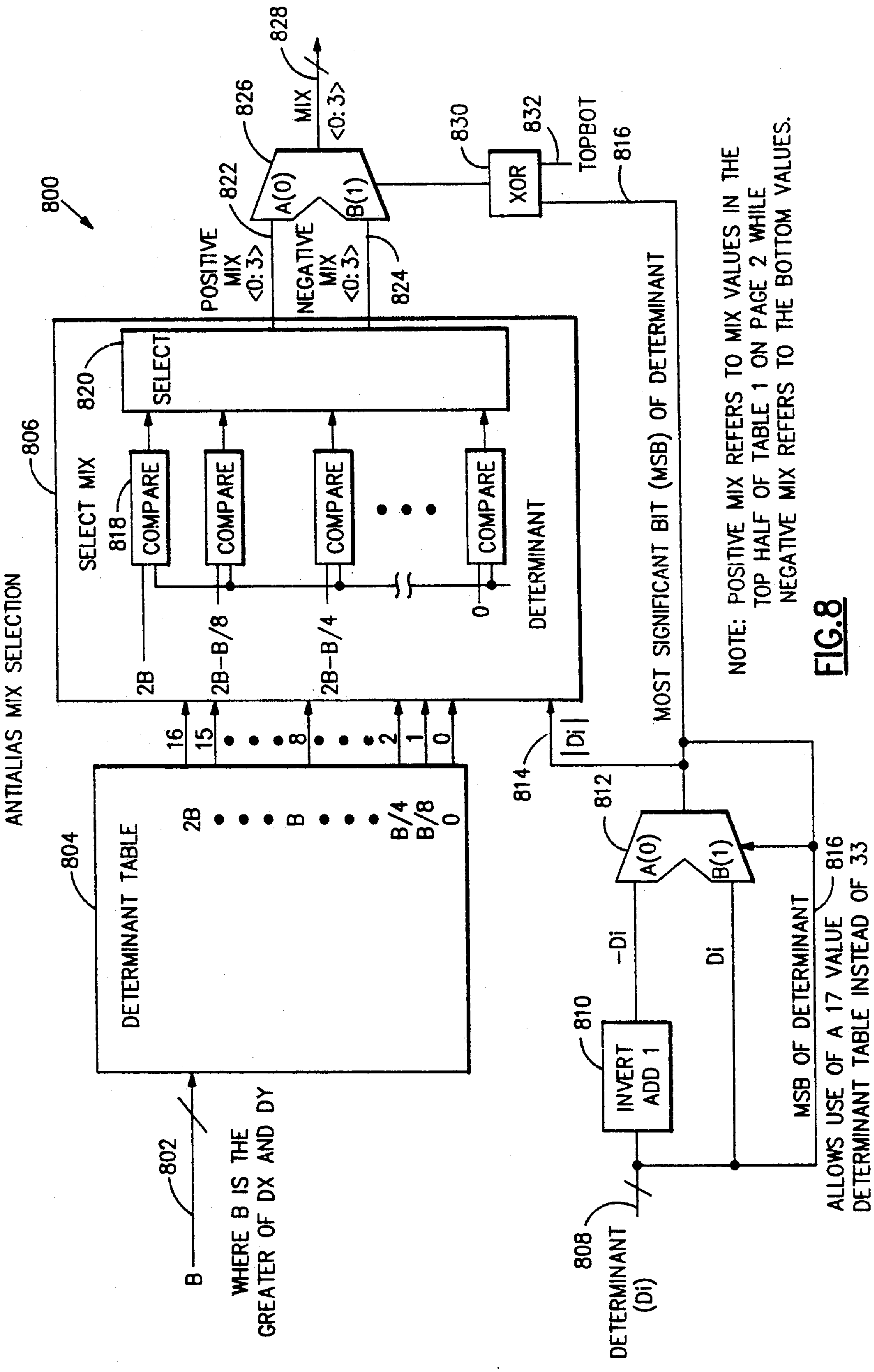
FIG. 8 is a schematic block diagram of the mix value logic of the intensity value logic shown in FIG. 7.

FIG. 8 shows mix value logic 800 in more detail. Mix value logic 800 accepts as inputs the major axis increment B on lines 802 and the iteratively generated Bresenham determinant Di from iteration logic 720 (FIG. 7) on lines 808 and generates from these a mix value M on lines 828. Determinant table logic 804 generates from the major axis increment B on lines 802 a series of 17 outputs ranging between 0 and 2B in increments of B/8. These outputs are supplied to select mix logic 806.

The determinant Di, which is carried on lines 808 in 2's complement form, is supplied to a first (A) input of a selector 812 through inversion logic 810 and to the second (B) input of selector 812 directly. Inversion logic 810 inverts all the bits of Di, including the most significant bit (MSB) serving as the sign bit, and adds 1 to the result to generate −Di, also in 2's complement form, which is supplied to the A input of selector 812. The sign bit of Di, which appears on line 816, controls selector 812 in such a manner that it provides the absolute value |Di| on lines 814 to select mix logic 806.

Select mix logic 806 takes the absolute determinant value |Di| on lines 814 and compares it simultaneously to each of the 17 values 0–2B provided by determinant table logic 804, using individual comparators 818. Each comparator 818 generates a first logic output in response to an absolute determinant value |Di| equal to or less than the output from the determinant table logic 804 and generates a second logic output in response to an absolute determinant value |Di| greater than the output from the determinant table logic 804.

A selection circuit 820 consisting of combinatorial logic responsive to the outputs of comparators 818 generates a "positive" mix value on lines 822 as well as a "negative" mix value on lines 824. "Positive" mix values generated on lines 822 correspond to the bottom line mix values t listed in the upper portion of Table 2 ($Di \geqq 0$), as well as to the top line mix values s listed in the lower portion of Table 1 ($Di<0$); these mix values are used for nonnegative values of Di when drawing the pixels on or below the true line and for negative values of Di when drawing the pixels on or above the true line. "Negative" mix values generated on lines 824 correspond to the bottom line mix values t listed in the lower portion of Table 2 ($Di<0$), as well as to the top line mix values s listed in the upper portion of Table 1 ($Di \geqq 0$); these mix values are used for nonnegative values of Di when drawing the pixels on or below the true line and for negative values of Di when drawing the pixels on or above the true line.

A selector 826 is controlled by an exclusive OR (XOR) gate 830 responsive to the sign bit line 816 and a TOPBOT signal on line 832 which is 0 when the bottom pixels are drawn and is 1 when the top pixels are drawn. Selector 816 provides one of the mix values from lines 822 and 824 as an output on line 828, as determined by the signals on lines 816 and 830, in accordance with the scheme indicated in the previous paragraph. Table 3 below summarizes this selection scheme:

TABLE 3

| Sign Bit | TOPBOT | Mix Value |
|---|---|---|
| 0 | 0 | Positive |
| 0 | 1 | Negative |
| 1 | 0 | Negative |
| 1 | 1 | Positive |

Lines 828 carry a suitable 4-bit encoding of a mix value ranging between 0.0625 and 1.0000 in increments of 0.0625. Thus, 0000 may indicate a mix value of 0.0625, 1111 may indicate a mix value of 1.0000, and so on. The mix values thus generated are stored at the appropriate location in the frame buffer, as indicated by the X and Y pixel addresses generated in the manner described below. Preferably, each pixel location in the frame buffer also stores a 4-bit value indicating the line color, for a total of 8 bits indicating pixel intensity. The mix value bits are used to suitably modify the colors actually supplied to the display device, in a manner known in the art.

2. Generation of Address Values

If desired, the determinant values Di successively generated by the Bresenham iteration logic 720 (FIG. 7) may also be used to generate pixel address values as well as shading values. To do this, the first pass is performed between (X0, Y0) and (X1, Y1), while the second pass is performed in the reverse direction between (X1, Y1) and (X0, Y0). On either pass, the movement is diagonal if either Di $\geqq$B or $-B \leqq Di < 2A-B$; otherwise, the movement is along the major axis only.

The following is a description of how the same pixel addresses can be generated for both the below-line and above-line passes, using standard Bresenham iteration logic that decides the type of move (diagonally or along the major axis only) based upon a comparison with zero. Both passes may be made in the same direction, simplifying the task of drawing styled (i.e., broken) lines.

Figure 9:
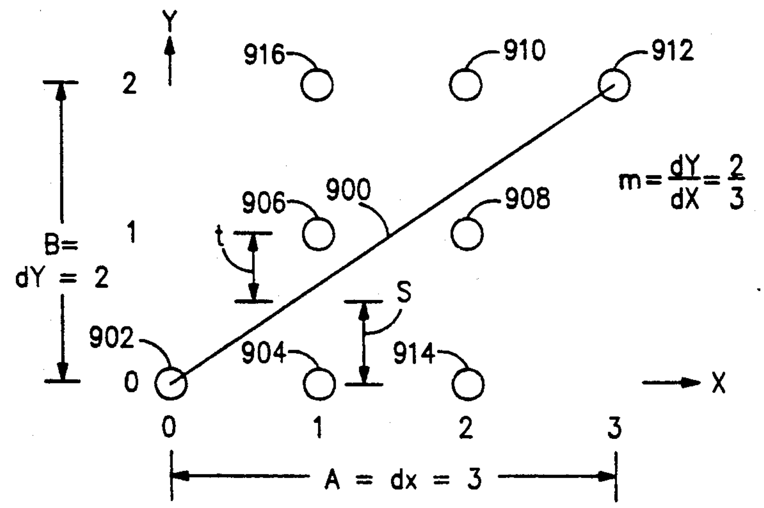
FIG. 9 illustrates the geometry involved in generating the address values for pixels above and below the true line.

FIG. 9 shows the geometric considerations involved in drawing pixels on a given side of a true line. Depicted in FIG. 9 is a true line 900 extending between a starting pixel 902 at (X, Y)=(0, 0) and an ending pixel 912 at (X, Y)=(3, 2). Using the definitions given above:

$$A = dY = 2$$

$$B = dX = 3.$$

In addition, line 900 has a slope m, where:

$$m = dY/dX = 2/3.$$

A conventional (aliased) Bresenham approximation of line 900 would draw pixels 902, 906, 908 and 912, since these are closest to the true line. On the other hand, to draw the pixels on or just below the true line, one would draw pixels 902, 904, 908 and 912. Similarly, to draw the pixels on or just above the true line, one would draw pixels 902, 906, 910 and 912.

In general, for a pixel 904 to be on or just below the line 900, the pixel must satisfy the relation:

$$0 \leqq s < 1$$

where s is the algebraic difference between the minor axis coordinate of the true line (at the major axis position of the pixel) and the minor axis coordinate of the pixel 904.

Pixels satisfying this condition can be generated iteratively as follows. Begin with the starting pixel 902, which satisfies the condition with s=0. Tentatively assume a move along the major axis only (to pixel 904), so that s is incremented by m:

$$s = s + m.$$

If the new s still satisfies the condition $0 \leqq s < 1$, it is the proper pixel. On the other hand, if $s \geqq 1$, then the tentatively selected pixel is too far below the line (as is pixel 914 in FIG. 9), and the pixel above it should be chosen, for a diagonal move, and s decremented by 1. The process is then repeated for the next pixel until the end of the line is reached.

Similarly, for a pixel 906 to be on or just above the line 900, the pixel must satisfy the relation:

$$0 \leqq t < 1$$

where t is the algebraic difference between the minor axis coordinate of the pixel 906 and the minor axis coordinate the true line at the major axis position of the pixel.

Pixels satisfying this latter condition can be likewise generated iteratively as follows. Begin with the starting pixel 902, which satisfies the condition with t=0. Tentatively assume a move along the major axis only (to pixel 904), so that t is decremented by m:

$$t = t - m.$$

If the new t still satisfies the condition $0 \leqq t < 1$, the tentatively selected pixel is the proper pixel. On the other hand, if $t < 0$ (as would be the case for pixel 904), then the tentatively selected pixel is below the line, and the pixel above it (pixel 906 in this case) should be chosen, for a diagonal move, and t incremented by 1. The process is then repeated for tile next pixel until tile end of the line is reached.

It may be readily verified that each of these line-drawing procedures can be accomplished by a conventional Bresenham line generator, performing tile procedure shown in FIG. 2, with appropriate selection of the Bresenham parameters. Thus, for drawing pixels on or just below the true line 900 (FIG. 9), the following Bresenham parameters are generated:

$$Di = A - B$$

$$Pc = A$$

$$Nc = A - B.$$

Similarly, for drawing pixels on or just above the true line 900, the following Bresenham parameters are generated:

$$Di = -A$$

$$Pc = B - A$$

$$Nc = -A.$$

Figure 10:
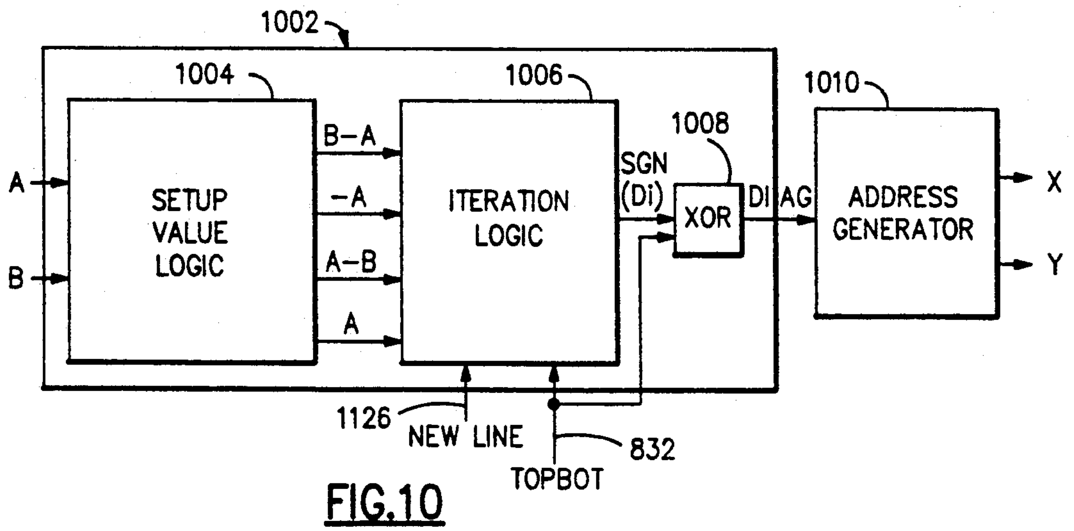
FIG. 10 is a schematic block diagram of the address value logic of the present invention.

FIG. 10 shows the general arrangement of the addressing logic of the antialiasing logic 118 (FIG. 1). As shown in FIG. 10, addressing logic 1002 contains setup value logic 1004 and iteration logic 1006. Setup value logic 1004 consists of combinatorial logic responsive to the minor and major axis increments to generate top-line parameters B−A and −A and bottom-line parameters A−B and A. Iteration logic 1006 is responsive to these parameters as well as to a NEWLINE signal, which initializes the iteration logic 1006 , and the previously identified TOPBOT signal , which selects either the top- line parameters B−A and A or the bottom-line parameters A−B and A. Iteration logic 1006 performs the standard Bresenham iteration (FIG. 2) , using the parameters selected by the TOPBOT signal, to provide an output indicating the sign of the Bresenham determinant Di generated in the course of the iteration. An XOR gate responsive to the Di sign bit and to the TOPBOT signal provides a DIAG signal to an X-Y address generator 1010, which generates X and Y addresses for accessing the frame buffer. Address generator 1010 normally increments the X and Y addresses purely along the major axis, but increments the addresses diagonally, along both axes, in response to the DIAG signal from address logic 1002.

Figure 11:
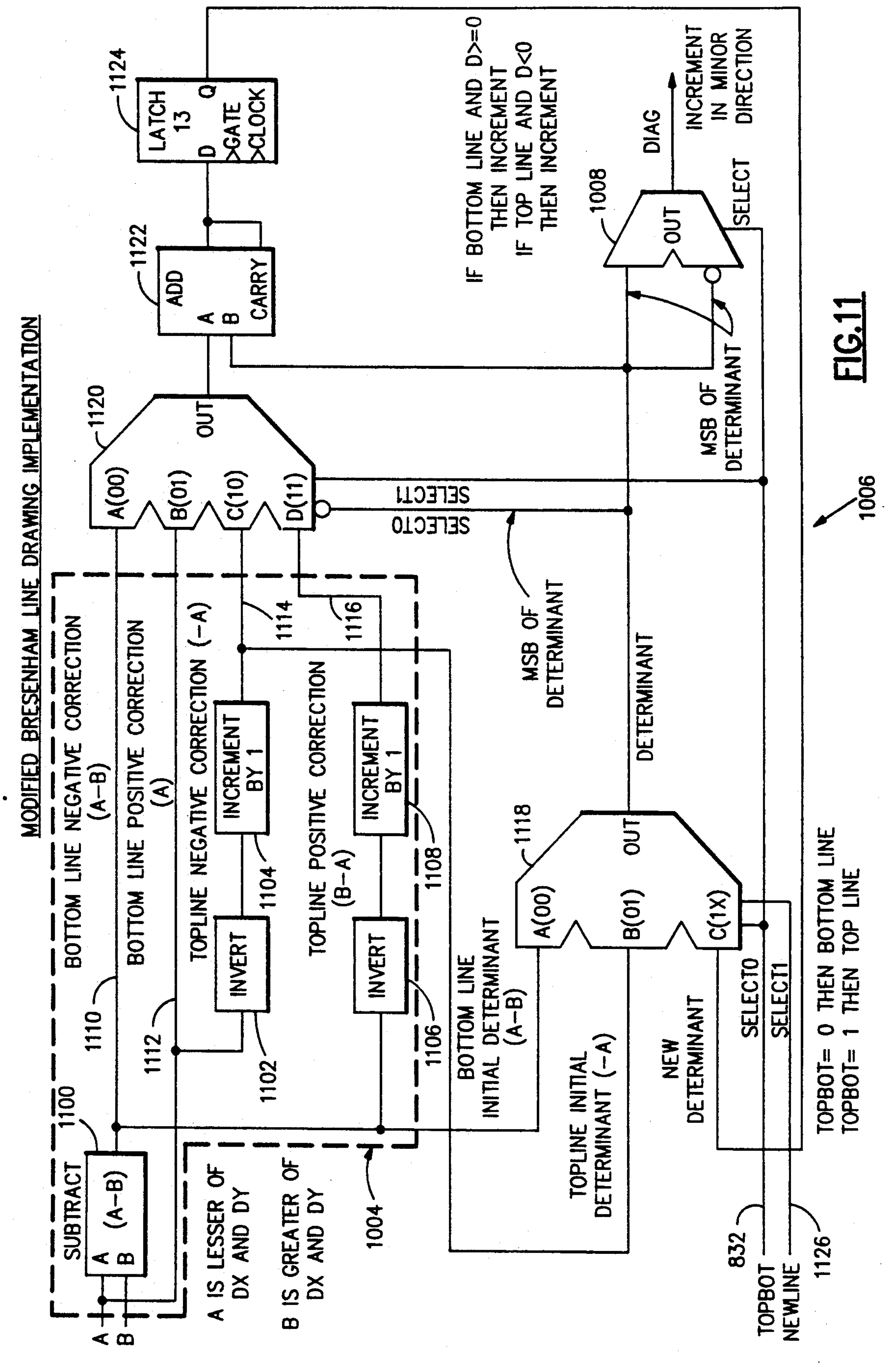
FIG. 11 is a schematic block diagram of a portion of the address value logic shown in FIG. 10.

FIG. 11 shows setup value logic 1004, iteration logic 1006 and XOR gate 1008 in more detail. Setup value logic 1004 includes a subtractor 1100, a first inverter 1102 and incrementer 1104, and a second inverter 1106 and incrementer 1108. Subtractor 1100 responds to A and B inputs representing the minor and major axis increments to generate a bottom line negative correction and initial determinant signal (A−B) on lines 1110. The A input to subtractor 1100 itself appears as a bottom line positive correction. signal on lines 1112. Inverter 1102 and incrementer 1104 function in a manner similar to the inverter and incrementer 810 shown in FIG. 8 to generate a top line negative correction and initial determinant signal (−A) on lines 1114, while inverter 1106 and incrementer 1108 function similarly to generate a top line positive correction signal (B−A) on lines 1116.

Iteration logic 1006 includes a 3-way selector 1118, a 4-way selector 1120, and adder 1122, and a latch 1124. Adder 1122 is operable on each cycle to add the outputs from selectors 1118 and 1120 and store the result in latch 1124. To generate address values for pixels on or below the true line, TOBOT line 812 (FIG. 8) is held at 0, while a NEWLINE line 1126 is momentarily brought to 0 to select the bottom line initial determinant (A−B) as an initial output from selector 1118. This output from selector 1118 is presented to the B input to adder 1122. At the same time, since (A−B) is necessarily negative, selector 1120 selects the bottom line positive correction (A) as an output to the A input of adder 1122. As a result, latch 1124 is initially loaded with (2A−B). This in effect combines the first two Bresenham iterations into one cycle, which is permissible in this situation since the first two pixels will always be spaced purely along the major axis from each other.

On each succeeding iteration, with NEWLINE at 1, the current value of the determinant Di stored in the latch 1124 is presented to the B input of adder 1122 via selector 1118. At the same time, the A input of adder 1122 receives either the bottom line negative correction (A−B), if the most significant bit (MSB) of the determinant Di is 1 (i.e., Di ≧0), or the bottom line positive correction (A) if the most significant bit (MSS) of the determinant Di is 0 (i.e. , Di 0). A 2-input selector 1008 effectively XORs the sign bit of Di with the TOPBOT signal on line 832 (which is 0 for the pass below the true line ) to generate a DIAG signal, resulting in a minor axis increment, whenever Di≧0.

Similarly, to generate address values for pixels on or above the true line, TOPBOT line 812 (FIG. 8) is held at 1, while a NEWLINE line 1126 is momentarily brought to 0 to select the top line initial determinant (−A) as an initial output from selector 1118. This output from selector 1118 is presented to the B input to adder 1122. At the same time, since (−A) is necessarily negative, selector 1120 selects the top line positive correction (B−A) as an output to the A input of adder 1122. As a result, latch 1124 is initially loaded with (B−2A). This again combines the first two Bresenham iterations into one cycle, which is permissible since the first two pixels on this pass will always be spaced diagonally from each other.

On each succeeding iteration, with NEWLINE at i., the current value of the determinant Di stored in the latch 1124 is presented to the B input of adder 1122 via selector 1118. At the same time, the A input of adder 1122 receives either the top line negative correction (−A), if the most significant bit (MSB) of the determinant Di is 1 (i.e., Di ≧0), or the top line positive correction (B−A) if the most significant bit (MSB) of the determinant Di is 0 (i.e., Di<0). Selector 1008 XORs the sign bit of Di with the TOPBOT signal on line 832 (which is 1 for the pass above the true line) to generate a DIAG signal, resulting in a minor axis increment, whenever Di<0.

The operation of the circuits shown FIGS. 10 and 11 when generating pixel address values for the line shown in FIG. 4 will now be described. Since the line shown in FIG. 4 extends between (0, 0) and (9, 3), we have:

$$A = dY = 3 \qquad B = dX = 9.$$

For the first pass, in which pixels on or below the true line are drawn, the following Bresenham parameters are initially generated:

$$Pc = A = 3 \qquad Nc = Di = A - B = -6.$$

Table 4 shows the values of Di, X and Y that are generated on successive iterations when drawing pixels on or below the true line. For each iteration, the Di listed is the value that is stored in latch 1124 at the end of the iteration. Note that on this pass the pixel address increments along the minor (Y) axis whenever the value of Di from the previous iteration is equal to or greater than zero.

TABLE 4

Address Values Generated for Pixels Below the True Line

| Iteration | Di | X | Y |
|---|---|---|---|
| 0 | −6 | 0 | 0 |
| 1 | −3 | 1 | 0 |
| 2 | 0 | 2 | 0 |
| 3 | −6 | 3 | 1 |
| 4 | −3 | 4 | 1 |
| 5 | 0 | 5 | 1 |
| 6 | −6 | 6 | 2 |
| 7 | −3 | 7 | 2 |
| 8 | 0 | 8 | 2 |
| 9 | −6 | 9 | 3 |

For the second pass, in which pixels on or above the true line are drawn, the following Bresenham parameters are initially generated:

$$Pc = B - A = 6 \qquad Nc = Di = -A = -3.$$

Table 5 shows the values of Di, X and Y that are generated on successive iterations when drawing pixels on or above the true line. For each iteration, the Di listed is the value that is stored in latch 1124 at the end of the iteration. Note that on this pass the pixel address increments along the minor (y) axis whenever the value of Di from the previous iteration is less than zero.

TABLE 5

| Address Values Generated for Pixels Above the True Line | | | |
|---|---|---|---|
| Iteration | Di | X | Y |
| 0 | −3 | 0 | 0 |
| 1 | 3 | 1 | 1 |
| 2 | 0 | 2 | 1 |
| 3 | −3 | 3 | 1 |
| 4 | 3 | 4 | 2 |
| 5 | 0 | 5 | 2 |
| 6 | −3 | 6 | 2 |
| 7 | 3 | 7 | 3 |
| 8 | 0 | 8 | 3 |
| 9 | −3 | 9 | 3 |

It will be noted that pixels exactly on the true line, as at (0, 0), (3, 1), (6, 2) and (9, 3) in this example, are drawn on both passes, so that the locations addressed on the two passes are not simply one pixel apart in the minor axis direction. This is done deliberately to avoid writing a zero intensity value to a pixel spaced exactly one unit from the true line in the minor axis direction, as this would produce rendering artifacts.

3. Overall Operation

Intensity value logic 700 (FIGS. 7-8) and address value logic 1002 (FIGS. 10-11) of antialiasing logic 118 (FIG. 1) operate in tandem to generate a two-pass, two-pixel approximation of an ideal line. Intensity value logic 700 generates intensity (mix) values on lines 828, while address generator 1010 (FIG. 10) coupled to address value logic 1002 generates the X and Y address values. The intensity values are written into the appropriate location of frame buffer 112 as indicated by the address values, for later display by monitor 114, via pixel bus 120. Not only is the line drawn an accurate approximation of the true line, but the hardware required is minimal and entails primarily standard Bresenham line generators with minor modifications.

What is claimed is:

1. In a graphics system in which a two-dimensional pixel image is generated for display by a raster-scan device, a method of generating intensity values for an antialiased pixel approximation of a line segment extending between a first point and a second point spaced from each other along major and minor coordinate axes, said method comprising the steps of:

generating integer valued Bresenham parameters including a positive correction, a negative correction, and an initial determinant;

iteratively generating a new value of the determinant for each pixel along said line segment as a function of the previous value of the determinant and the positive and negative corrections;

generating an intensity value for said pixel along said line segment as a function of the value of the determinant generated for said pixel by performing the following steps:;

generating a plurality of comparison values ranging between zero and a predetermined multiple of the spacing of said points along said major axis;

comparing the value of the determinant generated for a pixel along said segment with each of said comparison values; and generating said intensity value in accordance with the results of said comparisons.

2. A method as in claim 1 in which said Bresenham parameters are generated in accordance with the equations $$Pc=2A$$

$$Nc=2A-2B$$

$$Di=2A-B$$

where Pc is the positive correction, Nc is the negative correction, Di is the initial determinant, A is the spacing of said points along said minor coordinate axis, and B is the spacing of said points along said major coordinate axis.

3. A method as in claim 2 in which the new value of said determinant Di is generated by incrementing the previous value Di by the negative correction Nc if the previous value Di is positive and by the positive correction Pc if the previous value Di is negative.

4. A method as in claim 3 in which the value of the determinant generated for a pixel along said segment is compared with each of said comparison values simultaneously.

5. A method as in claim 3 in which said comparison values range in absolute value between zero and 2B, where B is the spacing of said points along said major coordinate axis.

6. A method as in claim 3 in which intensity values are generated for pixels on one side of said line segment on a first iteration along said line segment and for pixels on the other side of said line segment on a second iteration along said line segment, each of said intensity values being generated in accordance with the results of said comparisons and in accordance with a signal indicating the first or second iteration.

7. A method as in claim 3 in which intensity values are generated for pixels on one side of said line segment on a first iteration along said line segment and for pixels on the other side of said line segment on a second iteration along said line segment, each of said intensity values being generated in accordance with the results of said comparisons and in accordance with a first signal indicating the first or second iteration and a second signal indicating the sign of the determinant.

8. A method as in claim 1 in which said graphics system includes a frame buffer for storing intensity values for each of said pixels, said method comprising the further step of storing said generated intensity values in said frame buffer.

9. A method as in claim 1 comprising the further step of providing said generated intensity values to said raster scan device to display said pixel approximation of said line segment.

10. In a graphics system in which a two-dimensional pixel image is generated for display by a raster-scan device, apparatus for generating intensity values for an antialiased pixel approximation of a line segment extending between a first point and a second point spaced from each other along major and minor coordinate axes, said apparatus comprising:

means for generating integer valued Bresenham parameters including a positive correction, a negative correction, and an initial determinant;

means for generating a new value of the determinant for each pixel along said line segment as a function of the previous value of the determinant and the positive and negative corrections; and means for generating an intensity value for said pixel along said line segment as a function of the new value of the determinant wherein said means for generating an intensity value includes:

means for generating a plurality of comparison values of said determinant;

means for comparing the value of the determinant generated for a pixel along said segment with each of said values of said determinant;

means for generating said intensity values in accordance with the results of said comparisons.

11. Apparatus as in claim 10 in which said Bresenham parameters are generated in accordance with the equations $$Pc=2a$$

$$Nc=2A=2b$$

$$Di=2A-B$$

where Pc is the positive correction, Nc is the negative correction, Di is the initial determinant, A is the spacing of said points along said minor coordinate axis, and B is the spacing of said points along said major coordinate axis.

12. Apparatus as in claim 11 in which the new value of said determinant Di is generated by incrementing the previous value Di by the negative correction Nc if the previous value Di is positive and by the positive correction Pc if the previous value Di is negative.

13. Apparatus as in claim 12 in which said comparing means comprises a plurality of comparators for simultaneously comparing the determinant generated for a pixel along said segment with each of said stored values of said determinant.

14. Apparatus as in claim 12 in which said comparison values range in absolute value between zero and 2B, where B is the spacing of said points along said major coordinate axis.

15. Apparatus as in claim 12 in which intensity values are generated for pixels on one side of said line segment on a first iteration along said line segment and for pixels on the other side of said line segment on a second iteration along said line segment, each of said intensity values being generated in accordance with the results of said comparisons and in accordance with a signal indicating the first or second iteration.

16. Apparatus as in claim 12 in which intensity values are generated for pixels on one side of said line segment on a first iteration along said line segment and for pixels on the other side of said line segment on a second iteration along said line segment, each of said intensity values being generated in accordance with the results of said comparisons and in accordance with a first signal indicating the first or second iteration and a second signal indicating the sign of the determinant.

17. Apparatus as in claim 10 in which said graphics system includes a frame buffer for storing intensity values for each of said pixels, said apparatus further comprising means for storing said generating intensity values in said frame buffer.

18. Apparatus as in claim 10 further comprising means for providing said generated intensity values to said raster scan device to display said pixel approximation of said line segment.

19. In a graphics system in which a two-dimensional pixel image is generated for display by a raster-scan device, a method of generating pixel positions for an antialiased pixel approximation of a line segment extending between a first point and a second point spaced from each other along minor and major coordinate axes, said method comprising the steps of:

generating integer valued Bresenham parameters including a positive correction, a negative correction, and an initial determinant;

iteratively generating a new value of the determinant for each pixel along said line segment as a function of the previous value of the determinant and the positive and negative corrections; and generating a pixel position for said pixel along said line segment as a function of the value of the determinant generated for said pixel wherein pixel positions for pixels on one side of said line segment are generated on a first performance of the method steps above and for pixels on the other side of said line segment are generated on a second performance of the method steps above.

20. A method as in claim 19 in which said Bresenham parameters are generated in accordance with the equations $$Pc=A$$

$$Nc=De=A-B$$

on the first performance of the steps and in accordance with the equations $$Pc=B-A$$

$$Nc=Di=-A$$

on the in the second performance of the steps, where Pc is the positive correction, Nc is the negative correction, Di is the initial determinant, A is the spacing of said points along said minor coordinate axis, and B is the spacing of said points along said major coordinate axis.

21. A method as in claim 19 in which said new value of said determinant is generated by incrementing the previous value by the positive correction if the current value is less than zero and by the negative correction if the current value is greater than zero.

22. A method as in claim 19 in which said pixel position is generated by moving along the major axis if the current value of the determinant is less than zero and by moving diagonally if the current value of the determinant is greater than zero.

23. In a graphics system in which a two-dimensional pixel image is generated for display by a raster-scan device, apparatus for generating pixel positions for an antialiased pixel approximation of a line segment extending between a first point and a second point spaced from each other along minor and major coordinate axes, said apparatus comprising: means for generating integer valued Bresenham parameters including a positive correction, a negative correction, and an initial determinant;

means for iteratively generating a new value of the determinant for each pixel along said line segment as a function of the previous value of the determinant and the positive and negative corrections; and means for generating a pixel position for said pixel along said line segment as a function of the value of the determinant generated by said pixel wherein the pixel positions are generated for pixels on one side of said line segment by first using said apparatus with a first Bresenham parameter set and for pixels on the other side of said line segment by repeating use of said apparatus with a second Bresenham parameter set.

24. Apparatus as in claim 23 in which said first Bresenham parameter set is generated in accordance with the equations $$Pc=A$$

$$Nc=Di=A-B$$

and said second Bresenham parameter set is generated in accordance with the equations $$Pc=B-A$$

$$Nc=Di=-A$$

where Pc is the positive correction, Nc is the negative correction, Di is the initial determinant, A is the spacing of said points along said minor coordinate axis, and B is the spacing of said points along said major coordinate axis.

25. Apparatus as in claim 23 in which said new value of said determinant is generated by incrementing the previous value by tile positive correction if the current value is less than zero and by the negative correction if the current value is greater than zero.

26. Apparatus as in claim 23 in which said pixel position is generated by moving along the major axis if the current value of the determinant is less than zero and by moving diagonally if the current value of the determinant is greater than zero.

27. Apparatus as in claim 23, further comprising:

second means for generating integral Bresenham parameters including a positive correction, a negative correction, and an initial determinant;

second means for generating a new value of the determinant for each pixel along said segment as a function of the previous value of the determinant and the positive and negative corrections; and means for generating an intensity value for each pixel along said segment as a function of the new value of the determinant generated by said second determinant-generating means.

* * * * *